(12) United States Patent
Bi

(10) Patent No.: US 7,659,645 B2
(45) Date of Patent: Feb. 9, 2010

(54) VIBRATION-DAMPING ROTOR ASSEMBLY

(75) Inventor: Ronghua Bi, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 0 days.

(21) Appl. No.: 12/170,520

(22) Filed: Jul. 10, 2008

(65) Prior Publication Data

US 2008/0265698 A1 Oct. 30, 2008

Related U.S. Application Data

(63) Continuation of application No. 11/343,676, filed on Jan. 31, 2006, now abandoned.

(51) Int. Cl.
*H02K 29/00* (2006.01)
*H02K 1/18* (2006.01)

(52) U.S. Cl. ............ 310/51; 310/216.124; 310/216.127

(58) Field of Classification Search .................. 310/51, 310/91, 261, 216.124, 216.127
See application file for complete search history.

(56) References Cited

U.S. PATENT DOCUMENTS 5,027,026 A * 6/1991 Mineta et al. ............... 310/259
5,704,111 A * 1/1998 Johnson et al. ............... 29/598

\* cited by examiner

*Primary Examiner*—Tran N Nguyen
(74) *Attorney, Agent, or Firm*—Matthias Scholl P.C.; Matthias Scholl

(57) ABSTRACT

A rotor assembly comprising a rotor for rotating in a magnetic field of a motor, the rotor comprising a main rotor cavity and a plurality of first holes; two side boards, each side board comprising a sleeve-shaped main side board body and a disc-shaped outer side board body, the side board body having a main side board cavity, and the outer side board body being perforated by a plurality of second holes; two damping elements each damping element comprising a main damping element cavity; a plurality of rubber sleeves, each rubber sleeve having a rubber sleeve lip; and a plurality of third holes; an axle; and a plurality of positioning pins.

10 Claims, 2 Drawing Sheets

VIBRATION-DAMPING ROTOR ASSEMBLY

CROSS-REFERENCE TO RELATED APPLICATIONS

This application is a continuation of U.S. application Ser. No. 11/343,676 filed Jan. 31, 2006, now pending, the contents of which are incorporated herein by reference.

BACKGROUND OF THE INVENTION

1. Field of the Invention

The invention relates to a rotor assembly, and more particularly to a rotor assembly of a motor which reduces vibrations of the rotor resulting from high frequency resonance of the current.

2. Description of the Related Art

A rotor assembly and an axle of a motor are two isolated parts; conventionally, there is no connector sandwiched therebetween. Therefore, when the rotor assembly is rotated, its movement is not smooth due to high frequency resonance of the induced current. As such, the rotation of the axle generates noises and may even cause destructive resonance. Adding damping elements between the rotor and the axle reduces noise. However, the damping elements are complicated and expensive.

To overcome these shortcomings, this invention provides an improved vibration-damping rotor assembly.

SUMMARY OF THE INVENTION

One objective of this invention is to provide a vibration-damping rotor assembly to damp out vibration caused by the high frequency resonance of current.

In one embodiment of the invention provided is a rotor assembly comprising: a rotor for rotating in a magnetic field of a motor, the rotor comprising a main rotor cavity and a plurality of first holes; two side boards, each side board comprising a sleeve-shaped main side board body and a disc-shaped outer side board body, the side board body having a main side board cavity, and the outer side board body being perforated by a plurality of second holes; two damping elements each damping element comprising a main damping element cavity; a plurality of rubber sleeves, each rubber sleeve having a rubber sleeve lip; and a plurality of third holes; an axle; and a plurality of positioning pins.

In a class of this embodiment, the axle extends through the main rotor cavity, two the main side board cavities, and two the main damping element cavities; the main side board body extends through the main damping element cavity and into the main rotor cavity; the plurality of the rubber sleeves is disposed respectively in the plurality of the first holes; the rubber sleeve lip forms a buffer between the rotor and side board; and the plurality of the positioning pins traverses the first holes, the second holes, and the third holes, respectively.

In a class of this embodiment, the rotor is firmly sandwiched between two the side boards and two the damping elements.

In a class of this embodiment, the rotor assembly is layered from top to bottom as follows: side board, damping element, rotor, damping element, side board.

In a class of this embodiment, the number of the first holes is equal to the number of the second holes and is equal to the number of the third holes, and is equal to the number of the positioning pins.

In a class of this embodiment, the number of the first holes, the number of the second holes, the number of the third holes, and the number of the positioning pins is each between 2 and 60, and particularly, is each 6.

In a class of this embodiment, the damping element, the side boards, and the positioning pins are made, at least in part, of vibration-damping material, such as rubber.

In a class of this embodiment, the rubber sleeve lip is washer-shaped, i.e., is in the shape of a circle having a centrally disposed circular cavity.

In a class of this embodiment, the positioning pins comprise pin main body and pin head, the pin head abutting the side board and securing the pin body within the first holes, the second holes, and the third holes, respectively.

In another embodiment of the invention provided is a rotor assembly comprising: a rotor having a top side and a bottom side, the rotor comprising a plurality of first through holes; a first side board and a second side board; a first damping element and a second damping element, each having a plurality of hollow cylindrical protrusions; and a plurality of positioning pins.

In a class of this embodiment, the first damping element is disposed against the top side of the rotor so that the hollow cylindrical protrusions protrude into the first through holes from the top side; and the first damping element is sandwiched between the first side board and the rotor by means of the positioning pins.

In a class of this embodiment, the second damping element is disposed against the bottom side of the rotor so that the hollow cylindrical protrusions protrude into the first through holes from the bottom side; and the second damping element is sandwiched between the second side board and the rotor by means of the positioning pins.

In a class of this embodiment, the positioning pins are greater in length than the cross-sectional width of the rotor, the first side board, the second side board, the first damping element, and the second damping element combined.

In a class of this embodiment, the number of the first through holes is equal to the number of the hollow cylindrical protrusions, and is equal to the number of the positioning pins.

In a class of this embodiment, the number of the first holes, the number of the hollow cylindrical protrusions, and the number of the positioning pins is each between 2 and 60, and particularly, 6.

In a class of this embodiment, the damping elements, the side boards, and the positioning pins are made, at least in part, of vibration-damping material, such as, e.g., rubber.

In a class of this embodiment, the positioning pins comprise pin main body and pin head, the pin head abutting the first side board or the second side board.

In another embodiment of the invention provided is a rotor assembly comprising: a permanent magnet rotor for an electric motor, the permanent magnet rotor having a plurality of through holes extending through an entire cross-section of the permanent magnet rotor; a plurality of positioning pins and means for reducing vibrations of the rotor assembly.

In a class of this embodiment, the means for reducing vibrations partially fills the through holes from both sides of the permanent magnet rotor and the means is securely attached to the permanent magnet rotor with the positioning pins In a class of this embodiment, the positioning pins protrude out of the rotor and the means for reducing vibration.

BRIEF DESCRIPTION OF THE DRAWINGS

The invention is described hereinbelow with reference to accompanying drawings, in which.

DETAILED DESCRIPTION OF THE INVENTION

Figure 1:
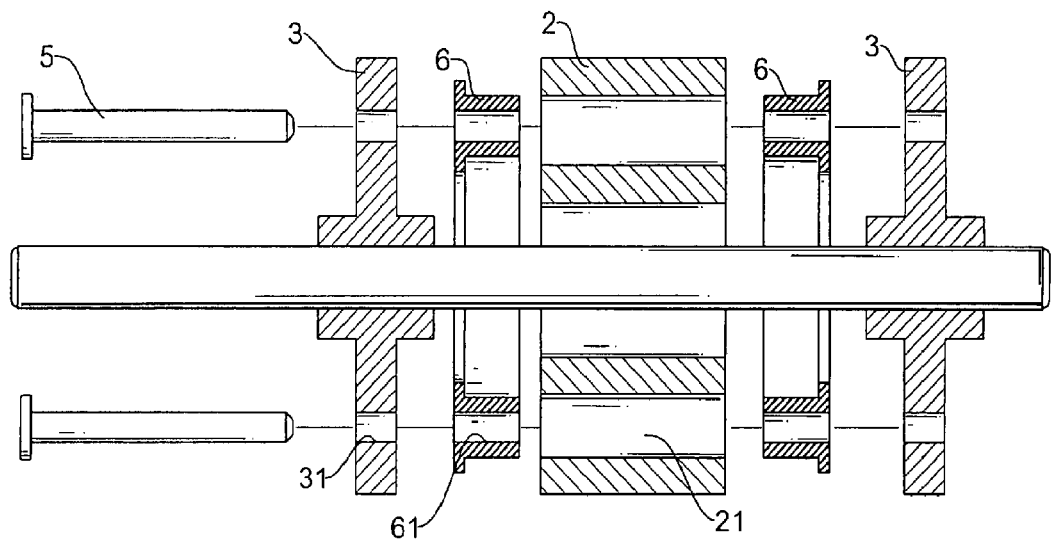
FIGS. 1 and 2 are cross-sectional views of the rotor assembly according to one embodiment of the invention.
Figure 2:
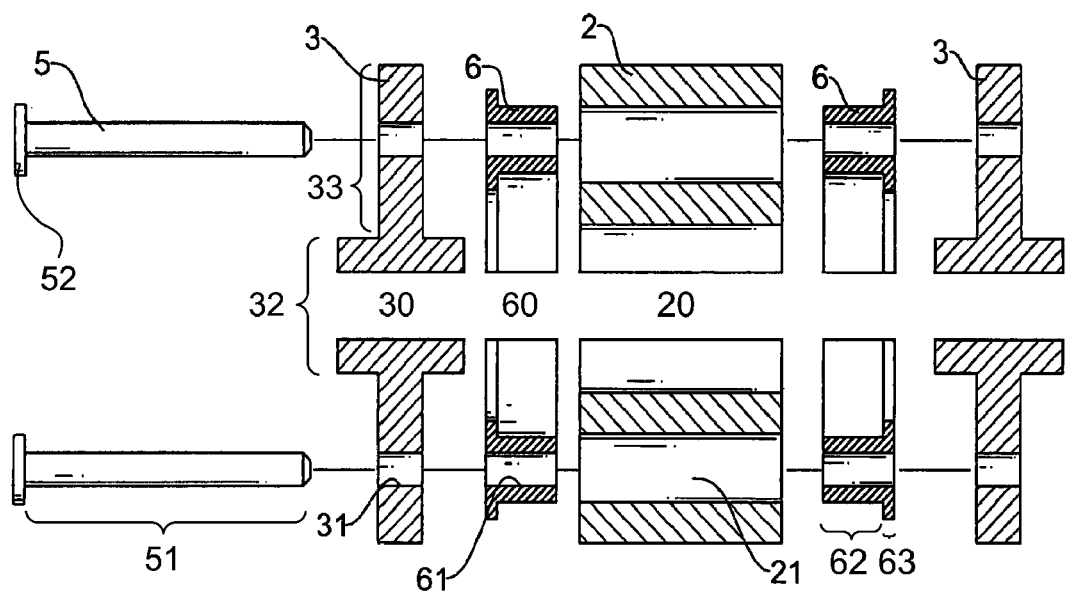
Figure 3:
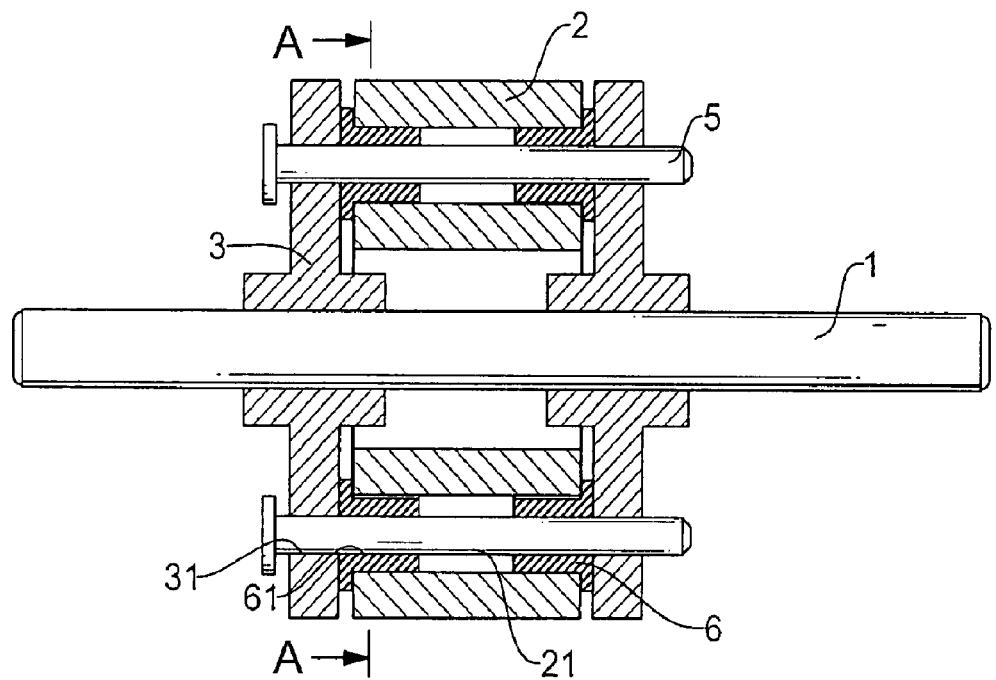
FIG. 3 is a schematic cross-sectional view of the rotor assembly.

With reference to FIGS. 1-3, the rotor assembly comprises a rotor (2) for rotating in a magnetic field of a motor, two side boards (3), two damping elements (6), an axle (1), and a plurality of positioning pins (5). The rotor comprises a main rotor cavity (20) and a plurality of first holes (21). Each side board (3) comprises a sleeve-shaped main side board body (32) and a disc-shaped outer side board body (33). The side board body (32) has a main side board cavity (30). The outer side board body (32) is perforated by a plurality of second holes (31). Each damping element (6) comprises a main damping element cavity (60); a plurality of rubber sleeves (62), each rubber sleeve having a rubber sleeve lip (63); and a plurality of third holes (61).

The axle (1) extends through the main rotor cavity (20), two the main side board cavities (30), and two the main damping element cavities (60). The main side board body (32) extends through the main damping element cavity (60) and into the main rotor cavity (20). A plurality of the rubber sleeves (62) is disposed respectively in the plurality of the first holes (21). The rubber sleeve lip (63) forms a buffer between the rotor (2) and the side board (3). A plurality of positioning pins (5) traverses the first holes (21), the second holes (31), and the third holes (61), respectively; that is one positioning pin (5) traverses one first hole (21), one second hole (31), and one third hole (61).

With reference to FIG. 3, the rotor (2) is firmly sandwiched between two the side boards (3) and two the damping elements (6). The rotor assembly is layered from top to bottom as follows: side board (3), damping element (6), rotor (2), damping element (6), and side board (3). Positioning pins (5) are mounted through the side boards, the damping element (6) and the rotor (2) to stably hold the damping elements (6) between the side boards (3) and the rotor (2). The second holes (31) are aligned with the third holes (61) that, in turn, align with the first holes (21) such that the positioning pins (5) protrude into the aligned first holes (21), the second holes (31) and the third holes (61) to assemble the rotor assembly after the axle (1) is first mounted through the side boards (3), the damping element (6) and the rotor (2). Preferably, the damping element (6) in this embodiment comprises a rubber sleeve mounted in a corresponding first hole (21) of the rotor (2) around a corresponding positioning pin (5). Preferably, a quantity of the first holes is between 2 and 60. Furthermore, the positioning pins (5) are made of metal or rubber or combination thereof. When the positioning pins (5) are made of rubber, the damping element (6) may be omitted.

Figure 4:
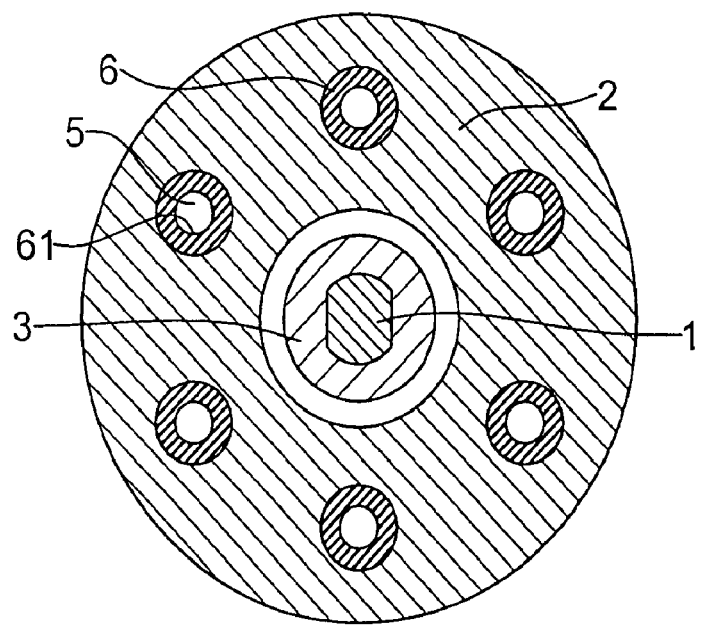
FIG. 4 is a cross-sectional view taken from line A-A of FIG. 3.

With reference to FIG. 4, the rubber sleeves are interconnected via a rubber ring and the third holes (61) are still defined in the rubber sleeves to allow the extension of the positioning pins (5) into the rotor (2).

As a consequence of the provision of the rotor assembly, when the outer rotor (2) is rotated and vibrated due to the high frequency resonance of the current, because the damping structure, i.e., the rubber sleeves (6) in the first holes (21) of the rotor (2), exists between the rotor (2) and the side boards (3), the vibration from the rotor (2) is effectively damped so that the force transmitted to the axle (1) is smooth and thus noise and vibration generated by the axle (1) is effectively reduced.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A rotor assembly comprising:
    a rotor for rotating in a magnetic field of a motor, said rotor comprising a main rotor cavity and a plurality of first holes;
    two side boards, each side board comprising a sleeve-shaped main side board body and a disc-shaped outer side board body, said side board body having a main side board cavity, and said outer side board body being perforated by a plurality of second holes;
    two damping elements each damping element comprising a main damping element cavity; a plurality of rubber sleeves, each rubber sleeve having a rubber sleeve lip; and a plurality of third holes;
    an axle; and
    a plurality of positioning pins;
    wherein
    said axle extends through said main rotor cavity, two said main side board cavities, and two said main damping element cavities;
    said main side board body extends through said main damping element cavity and into said main rotor cavity;
    said plurality of said rubber sleeves is disposed respectively in said plurality of said first holes;
    said rubber sleeve lip forms a buffer between said rotor and side board; and
    said plurality of said positioning pins traverses said first holes, said second holes, and said third holes, respectively.

2. The rotor assembly of claim 1, wherein said rotor is firmly sandwiched between two said side boards and two said damping elements.

3. The rotor of claim 1, wherein the rotor assembly is layered from top to bottom as follows: side board, damping element, rotor, damping element, side board.

4. The rotor of claim 1, wherein the number of said first holes is equal to the number of said second holes and is equal to the number of said third holes, and is equal to the number of said positioning pins.

5. The rotor of claim 1, wherein the number of said first holes, the number of said second holes, the number of said third holes, and the number of said positioning pins is each between 2 and 60.

6. The rotor of claim 1, wherein the number of said first holes, the number of said second holes, the number of said third holes, and the number of said positioning pins is each 6.

7. The rotor of claim 1, wherein said damping element, said side boards, and said positioning pins comprise vibration-damping material.

8. The rotor of claim 1, wherein said damping elements, said side boards, and said positioning pins comprise rubber.

9. The rotor of claim 1, wherein said rubber sleeve lip is washer-shaped.

10. The rotor of claim 1, wherein said positioning pins comprise pin main body and pin head, said pin head abutting said side board and securing said pin body within said first holes, said second holes, and said third holes, respectively.

* * * * *